(12) United States Patent
Frink

(10) Patent No.: US 7,544,303 B2
(45) Date of Patent: Jun. 9, 2009

(54) METHOD AND APPARATUS FOR REMOVING DEBRIS FROM SEPTIC WASTE

(76) Inventor: Norman Frink, 369 Foster Hill Rd., Henniker, NH (US) 03242

( * ) Notice: Subject to any disclaimer, the term of this patent is extended or adjusted under 35 U.S.C. 154(b) by 0 days.

(21) Appl. No.: 11/849,614

(22) Filed: Sep. 4, 2007

(65) Prior Publication Data

US 2009/0057242 A1    Mar. 5, 2009

(51) Int. Cl.
B01D 21/02 (2006.01)
(52) U.S. Cl. .............. 210/801; 210/803; 210/521; 210/532.2; 210/534; 210/536
(58) Field of Classification Search ............ 210/187, 210/521, 532.1, 532.2, 534, 535, 536, 801, 210/803
See application file for complete search history.

(56) References Cited

U.S. PATENT DOCUMENTS

| | | | | |
|---|---|---|---|---|
| 242,236 | A * | 5/1881 | Torelli | 210/534 |
| 826,580 | A * | 7/1906 | Keyes | 210/534 |
| 1,115,857 | A * | 11/1914 | Nabstedt | 210/532.2 |
| 1,120,351 | A * | 12/1914 | Weston | 210/532.2 |
| 1,204,534 | A * | 11/1916 | Andrews | 210/532.2 |
| 1,209,480 | A * | 12/1916 | Noel | 210/187 |
| 1,422,674 | A | 7/1922 | Cook | |
| 1,503,544 | A * | 8/1924 | Majors et al. | 210/534 |
| 1,563,247 | A * | 11/1925 | Bruso et al. | 210/535 |
| 1,616,394 | A * | 2/1927 | Schiding | 210/532.2 |
| 1,754,789 | A * | 4/1930 | Gracey | 210/187 |
| 2,058,044 | A * | 10/1936 | Spencer | 210/533 |
| 2,482,353 | A * | 9/1949 | Loelkes | 210/532.2 |
| 2,799,645 | A * | 7/1957 | Musgrove | 210/801 |
| 3,642,138 | A | 2/1972 | Sheda | |
| 3,875,066 | A | 4/1975 | Lind | |
| 4,319,998 | A | 3/1982 | Anderson | |
| 4,363,732 | A | 12/1982 | Crates et al. | |
| 4,525,277 | A | 6/1985 | Poulin | |
| 4,543,183 | A | 9/1985 | Petretti | |
| 4,664,795 | A * | 5/1987 | Stegall et al. | 210/532.2 |
| 4,961,864 | A | 10/1990 | Bruke | |
| 5,441,632 | A * | 8/1995 | Charon | 210/187 |
| 5,536,418 | A | 7/1996 | Foss | |
| 5,645,732 | A | 7/1997 | Daniels | |
| 5,720,885 | A | 2/1998 | Moos | |
| 5,826,979 | A | 10/1998 | Foss | |
| 6,190,548 | B1 | 2/2001 | Frick | |
| 6,267,882 | B1 | 7/2001 | Houck et al. | |
| 6,328,890 | B1 | 12/2001 | Thibault | |
| 6,576,130 | B2 | 6/2003 | Wallace | |
| 6,776,914 | B2 | 8/2004 | Hickey | |
| 6,790,368 | B1 | 9/2004 | Vachon et al. | |
| 6,858,138 | B2 | 2/2005 | Pattee | |
| 6,977,038 | B2 | 12/2005 | Jowett | |
| 7,169,296 | B2 | 1/2007 | Humphrey et al. | |
| 2004/0099588 | A1 | 5/2004 | Nurse, Jr. et al. | |

FOREIGN PATENT DOCUMENTS

CA        886247        11/1971

* cited by examiner

*Primary Examiner*—Christopher Upton
(74) *Attorney, Agent, or Firm*—Hayes Soloway P.C.

(57) ABSTRACT

The system involves a transitionary septic tank. The transitionary septic tank includes an enclosed containment body having an interior portion. An inlet opening is formed in the enclosed containment body. A first outlet opening is formed in the enclosed containment body. A divider is positioned in the interior portion between the inlet opening and the first outlet opening.

19 Claims, 6 Drawing Sheets

US 7,544,303 B2

METHOD AND APPARATUS FOR REMOVING DEBRIS FROM SEPTIC WASTE

FIELD OF THE INVENTION

The present invention is generally related to removal of debris from septic waste and more particularly is related to a transitionary septic tank useful for removing debris from septic waste.

BACKGROUND OF THE INVENTION

Leach field and septic tanks were developed more than 125 years ago. They involve septic wastes being stored on site, in a leach field, until emptied by a septic truck that transports the waste to a wastewater management location, where the septic truck empties the septic waste into wastewater treatment units. Unfortunately, sand, dirt, and rocks often make their way into the leach field septic tanks, get pulled into the septic trucks, then get released into the wastewater treatment units. The sand, dirt, and rocks increase wear and regularly damage wastewater treatment units by getting into gears and such.

Thus, a heretofore unaddressed need exists in the industry to address the aforementioned deficiencies and inadequacies.

SUMMARY OF THE INVENTION

Embodiments of the present invention provide a system and method for removing debris from septic waste. Briefly described, in architecture, one embodiment of the system, among others, can be implemented as follows. The system involves a transitionary septic tank. The transitionary septic tank includes an enclosed containment body having an interior portion. An inlet opening is formed in the enclosed containment body. A first outlet opening is formed in the enclosed containment body. A divider is positioned in the interior portion between the inlet opening and the first outlet opening.

The present invention can also be viewed as providing methods for removing debris from a septic tank sewerage before inputting the sewerage into a waste treatment tank. In this regard, one embodiment of such a method, among others, can be broadly summarized by the following steps: inputting the septic tank sewerage through an inlet opening and into an interior portion of an enclosed containment body; channeling the septic tank sewerage, at least briefly, into a lower portion of the enclosed containment body using a divider formed in the interior portion; and releasing the septic tank sewerage out a first outlet opening formed in the enclosed containment body, wherein at least a portion of the debris remains in the lower portion of the enclosed containment body.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
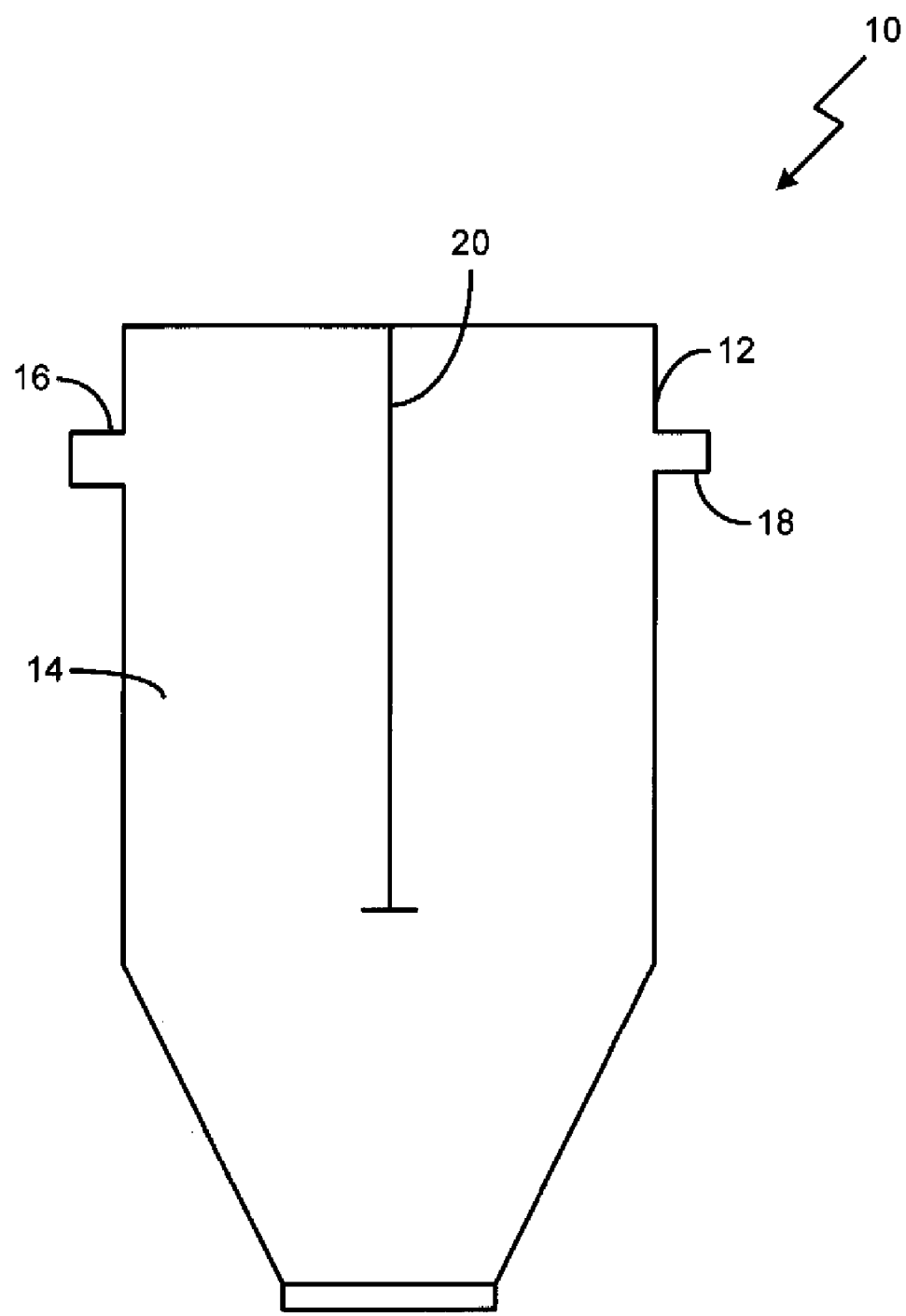
FIG. 1 is a cross-sectional view of a transitionary septic tank in accordance with a first exemplary embodiment of the present invention.

FIG. 1 is a cross-sectional view of a transitionary septic tank 10 in accordance with a first exemplary embodiment of the present invention. The transitionary septic tank 10 includes an enclosed containment body 12 having an interior portion 14. An inlet opening 16 is formed in the enclosed containment body 12. A first outlet opening 18 is formed in the enclosed containment body 12. A divider 20 is positioned in the interior portion 14 between the inlet opening 16 and the first outlet opening 18.

Figure 2:
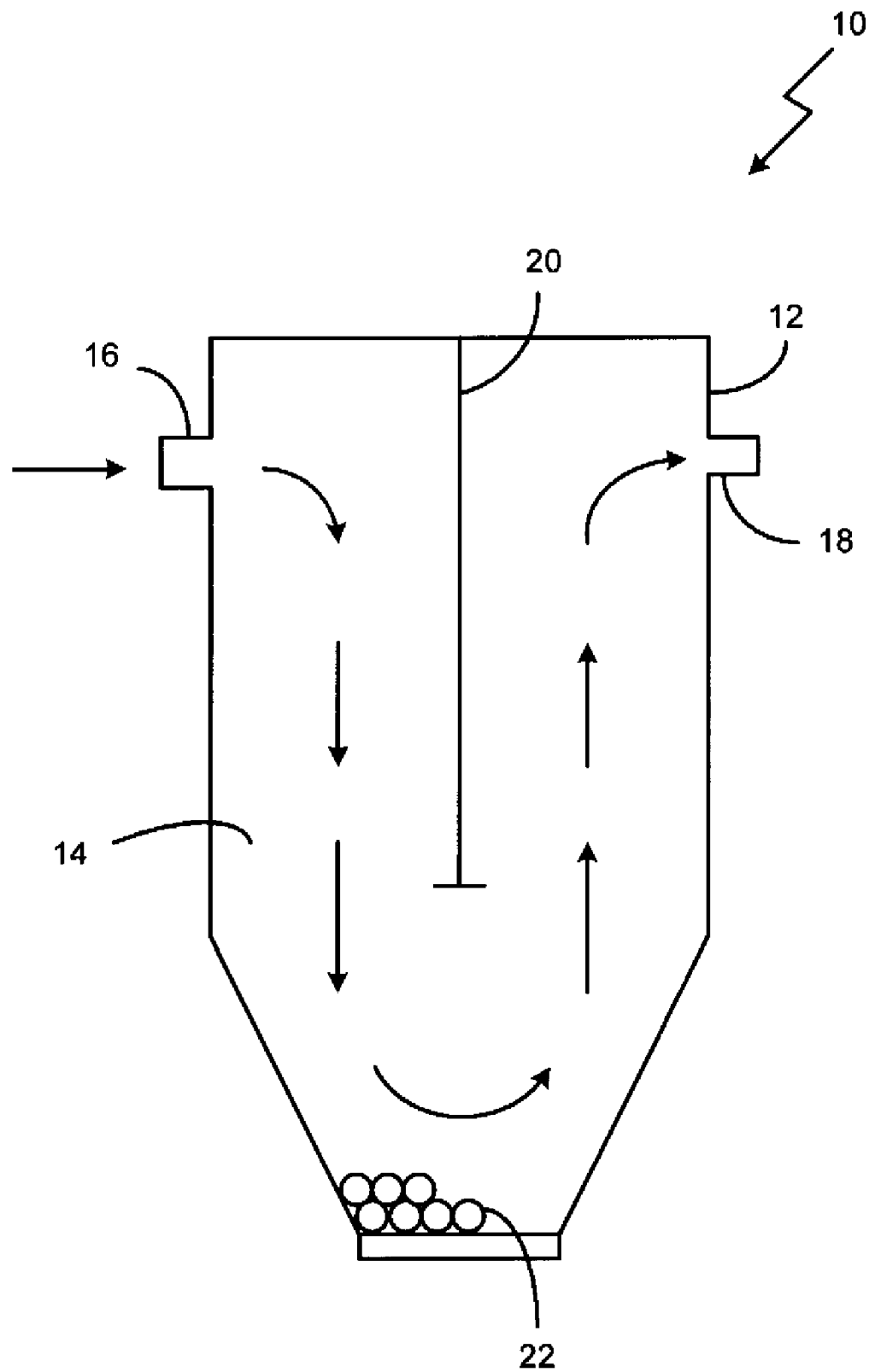
FIG. 2 is a cross-sectional view of the transitionary septic tank of FIG. 1, in accordance with the first exemplary embodiment of the present invention.

Operation of the transitionary septic tank 10 is as follows. FIG. 2 is a cross-sectional view of the transitionary septic tank 10 of FIG. 1, in accordance with the first exemplary embodiment of the present invention. Inflow of septic waste follows the arrows shown in FIG. 2. An inflow of septic waste is supplied through the inlet opening 16. The septic waste flows though the interior portion 14, directed by the divider 20. The sewer waste flows through the lower portion of the enclosed containment body 12. The sewer waste passes beneath the divider 20 and up to the first outlet opening 18. However, gravity keeps the debris 22 from the sewer waste, debris 22 such as sand, dirt, and rocks, in the bottom portion of the enclosed containment body 12.

The divider 20 can be a solid sheet of metal, a metal screen, or a similar obstruction. The divider 20 serves to slow the flow of sewer waste through the inlet opening long enough for the debris 22 to naturally separate from the sewer waste. The divider may be welded to a top of the enclosed containment body 12, suspended by one or more chains, or similarly held in place in a manner that separates the inlet opening 16 from the first outlet opening 18. An accessway may be provided proximate to the bottom of the enclosed containment body 12 to allow removal of debris 22 from the bottom section of the enclosed containment body 12.

The inlet opening 16 and the first outlet opening 18 may include one or more valves. The enclosed containment body 12 may be suspended or mounted on one or more legs to keep the enclosed containment body 12 off of the ground.

Figure 3:
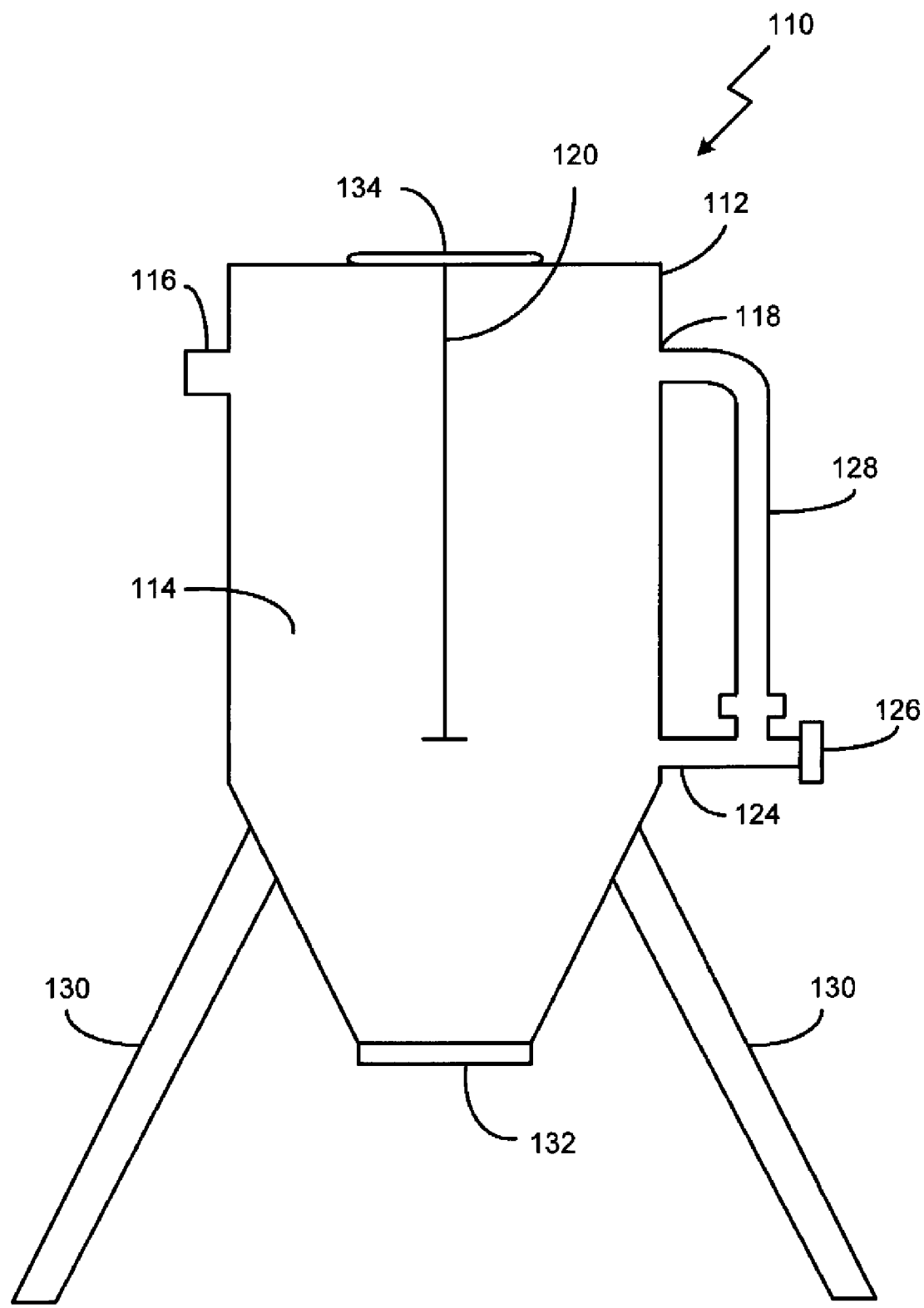
FIG. 3 is a cross-sectional view of a transitionary septic tank in accordance with a second exemplary embodiment of the present invention.

FIG. 3 is a cross-sectional view of a transitionary septic tank 110 in accordance with a second exemplary embodiment of the present invention. The transitionary septic tank 110 includes an enclosed containment body 112 having an interior portion 114. An inlet opening 116 is formed in the enclosed containment body 112. A first outlet opening 118 is formed in the enclosed containment body 112. A divider 120 is positioned in the interior portion 114 between the inlet opening 116 and the first outlet opening 118.

The divider 120 can be a solid sheet of metal, a metal screen, or a similar obstruction. The divider 120 serves to slow the flow of sewer waste through the inlet opening long enough for the debris to naturally separate from the sewer waste. The divider 120 may be welded to a top of the enclosed containment body 112, suspended by one or more chains, or similarly held in place in a manner that separates the inlet opening 116 from the first outlet opening 118. An access way may be provided proximate to the bottom of the enclosed containment body 112 to allow removal of debris from the bottom section of the enclosed containment body 112.

In accordance with the second exemplary embodiment, the enclosed containment body 112 includes a second outlet opening 124. The first outlet opening 118 and the second outlet opening 124 may be joined to a single release valve 126 by an outlet connecting pipe 128. During operation, once a volume of septic waste has been input through the input opening 116, it can be seen that not all the septic waste will be able to pass through the first output opening 118 due, at least, to gravitational limitations. Thus, to substantially empty the enclosed containment body 112, the second outlet opening 124 may be employed.

One or more legs 130 may be mounted to the enclosed containment body 112 to keep the enclosed containment body 112 elevated. A cover 134 may be provided at a top portion of the enclosed containment body 112 to access the interior portion 114 of the enclosed containment body 112. Access to the interior portion 114 may be beneficial when maintenance is required.

A release door 132 may be provided at a bottom portion of the enclosed containment body 112. The release door 132, when opened, may provide an access way proximate to the bottom of the enclosed containment body 112 to allow removal of debris from the bottom section of the enclosed containment body 112. It is envisioned that many trucks could pass septic waste through a transitionary septic tank 110 before the release door 132 would need to be opened to release debris. Similarly, the second outlet opening 124 may be used infrequently, as an empty enclosed containment body 112 may be an infrequent priority. The release door 132, when closed, should provide a liquid-tight seal.

Figure 4:
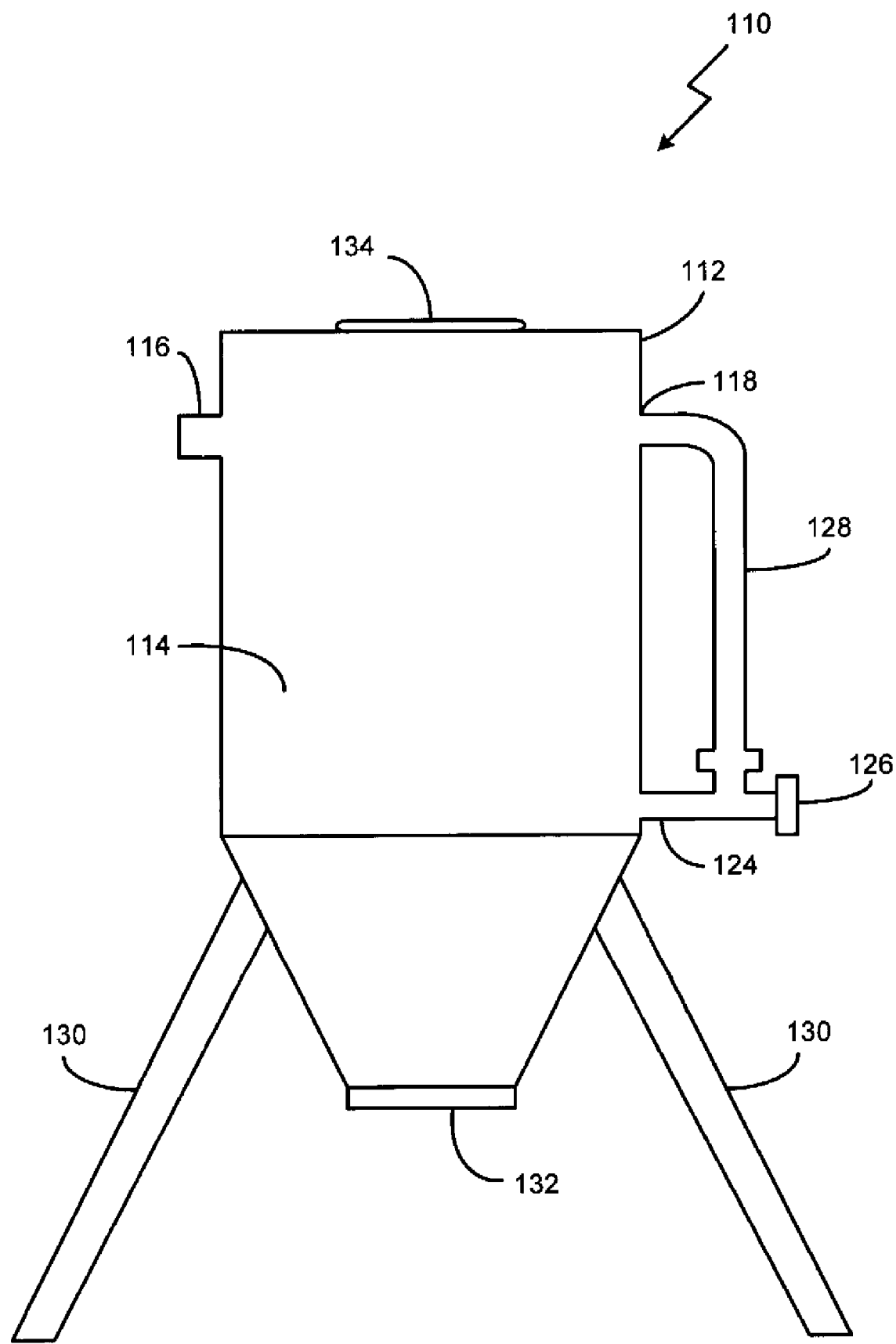
FIG. 4 is an exterior view of the transitionary septic tank of FIG. 3, in accordance with the second exemplary embodiment of the present invention.

FIG. 4 is an exterior view of the transitionary septic tank 110 of FIG. 3, in accordance with the second exemplary embodiment of the present invention. The bottom portion of the enclosed containment body 112 may be conical. The conical bottom portion, or any other three-dimensional shape with a cross-section that tapers from the rest of the enclosed containment body 112, may be useful for collecting the debris in a narrow bottom area for convenient removal.

Figure 5:
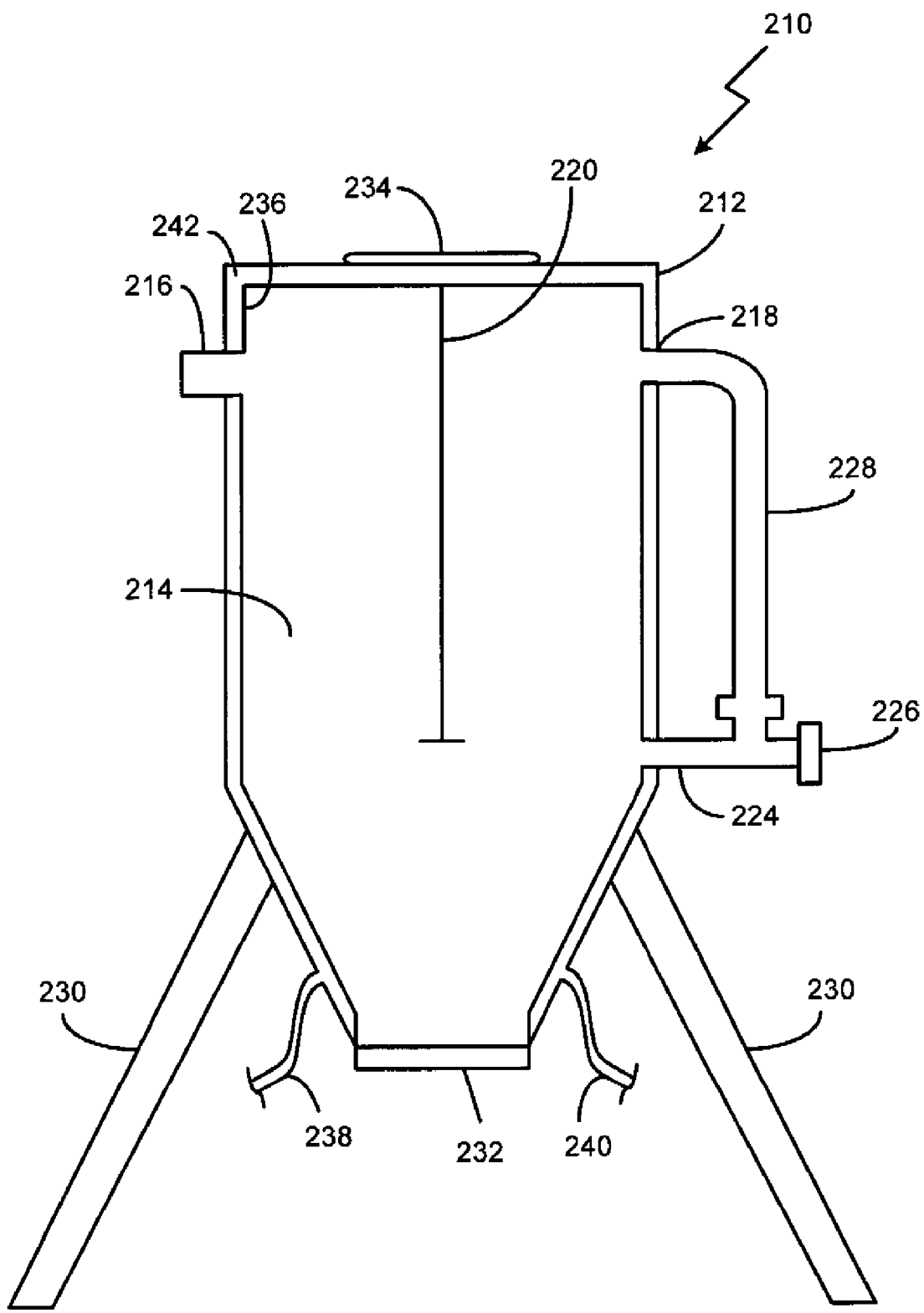
FIG. 5 is a cross-sectional view of a transitionary septic tank in accordance with a third exemplary embodiment of the present invention.

FIG. 5 is a cross-sectional view of a transitionary septic tank 210 in accordance with a third exemplary embodiment of the present invention. The transitionary septic tank 210 includes an enclosed containment body 212 having an interior portion 214. An inlet opening 216 is formed in the enclosed containment body 212. A first outlet opening 218 is formed in the enclosed containment body 212. A divider 220 is positioned in the interior portion 214 between the inlet opening 216 and the first outlet opening 218.

The divider 220 can be a solid sheet of metal, a metal screen, or a similar obstruction. The divider 220 serves to slow the flow of sewer waste through the inlet opening long enough for the debris to naturally separate from the sewer waste. The divider 220 may be welded to a top of the enclosed containment body 212, suspended by one or more chains, or similarly held in place in a manner that separates the inlet opening 216 from the first outlet opening 218. An access way may be provided proximate to the bottom of the enclosed containment body 212 to allow removal of debris from the bottom section of the enclosed containment body 212.

In accordance with the third exemplary embodiment, the enclosed containment body 212 includes a second outlet opening 224. The first outlet opening 218 and the second outlet opening 224 may be joined to a single release valve 226 by an outlet connecting pipe 228. During operation, once a volume of septic waste has been input through the input opening 216, it can be seen that not all the septic waste will be able to pass through the first output opening 218 due, at least, to gravitational limitations. Thus, to substantially empty the enclosed containment body 212, the second outlet opening 224 may be employed.

As the present invention is contemplated for outdoor placement and climate conditions may cause at least partial freezing of fluids flowing through the containment body 212, it may be advisable to provide a means for warming the containment body to a temperature above freezing. In accordance with the third exemplary embodiment, the enclosed containment body 212 may include an interior wall 236 formed along a substantial portion of an interior side of the containment body 212. As shown in FIG. 5, the interior wall 236 and the wall of the containment body 212 combine to create a perimeter channel 242 within the containment body 212. The perimeter channel 242 may be utilized to maintain the containment body 212 at a temperature above freezing. Inlet conduit 238 and outlet conduit 240 may be utilized to maintain a flow of heated fluids through the perimeter channel 242 to maintain the containment body 212 at a temperature above freezing. The heated fluids may be water, anti-freeze, heated gases, or other fluids as may be known to those having ordinary skill in the art.

As can be seen in FIG. 5, the interior wall 236 and the perimeter channel 242 may be shaped to avoid the openings 216, 218, 224, 232, although the perimeter channel 242 should permit flow from the inlet conduit 238 to the outlet conduit 240. The perimeter channel 242 may be provided in a winding pattern along the interior of the containment body 212 to give a constant flow path for the fluid within the perimeter channel 242. More than one perimeter channel 242 is contemplated. Further, locating at least one of the perimeter channels 242 on an exterior surface of the enclosed containment body 212 is contemplated.

One or more legs 230 may be mounted to the enclosed containment body 212 to keep the enclosed containment body 212 elevated. A cover 234 may be provided at a top portion of the enclosed containment body 212 to access the interior portion 214 of the enclosed containment body 212. Access to the interior portion 214 may be beneficial when maintenance is required. Other means of heating the containment body 212, including providing a heat trace, are contemplated by and considered to be within the scope of the present invention.

A release door 232 may be provided at a bottom portion of the enclosed containment body 212. The release door 232, when opened, may provide an access way proximate to the bottom of the enclosed containment body 212 to allow removal of debris from the bottom section of the enclosed containment body 212. It is envisioned that many trucks could pass septic waste through a transitionary septic tank 210 before the release door 232 would need to be opened to release debris. Similarly, the second outlet opening 224 may be used infrequently, as an empty enclosed containment body 212 may be an infrequent priority. The release door 232, when closed, should provide a liquid-tight seal.

Figure 6:
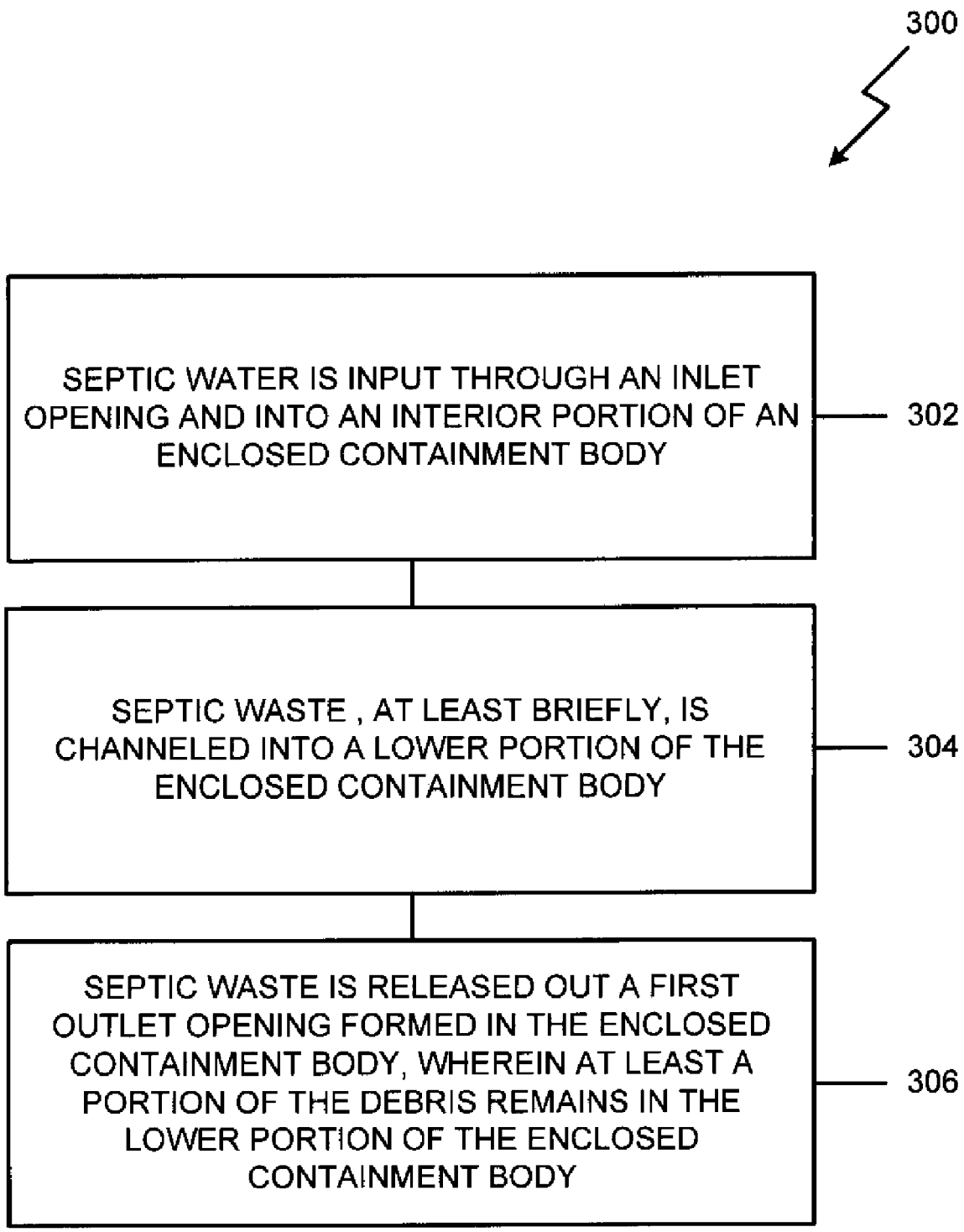
FIG. 6 is a flowchart illustrating a method of utilizing the transitionary septic tank of FIG. 3 to separate debris from septic waste, in accordance with the second exemplary embodiment of the invention.

FIG. 6 is a flowchart 300 illustrating a method of providing the abovementioned transitionary septic tank 110 in accordance with the second exemplary embodiment of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 302, septic waste is input through an inlet opening 116 and into an interior portion 114 of an enclosed containment body 112. The septic waste, at least briefly, is channeled into a lower portion of the enclosed containment body 112 using a divider 120 formed in the interior portion 114 (block 304). The septic waste is released out a first outlet opening 118 formed in the enclosed containment body 112, wherein at least a portion of the debris remains in the lower portion of the enclosed containment body 112 (block 306).

The method may further include opening a sealable door compatible 132 with a bottom opening formed in a bottom section of the enclosed containment body 112. The debris from the enclosed containment body 112 may be released through the bottom opening.

The method may further include releasing the septic waste out a second outlet opening formed in the enclosed containment body, wherein the second outlet opening is formed proximate to a bottom portion of the enclosed containment body. The method may further include inputting water through the inlet opening and into the interior portion of the enclosed containment body to flush out the interior portion of the enclosed containment body through the second opening.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A transitionary septic tank, comprising:
   an enclosed containment body having an interior portion;
   an inlet opening formed in the enclosed containment body;
   a first outlet opening formed proximate to an upper portion of the enclosed containment body;
   a second outlet opening within a sidewall of the enclosed containment body proximate to a bottom portion of the enclosed containment body;
   an outlet conduit exterior to the enclosed containment body fluidly connecting the first outlet opening and the second outlet opening; and
   a divider formed in the interior portion between the inlet opening and the first outlet opening.

2. The transitionary septic tank of claim 1, wherein the first outlet opening is formed proximate to a top portion of the enclosed containment body.

3. The transitionary septic tank of claim 1, further comprising an outlet valve connected to the outlet conduit.

4. The transitionary septic tank of claim 1, wherein the inlet opening further comprises an inlet valve and wherein the first outlet opening further comprises a first outlet valve.

5. The transitionary septic tank of claim 1, further comprising:
   a bottom opening formed in a bottom section of the enclosed containment body; and
   a sealable door compatible with the bottom opening.

6. The transitionary septic tank of claim 5, wherein the bottom section of the enclosed containment body is conical.

7. The transitionary septic tank of claim 1, wherein the enclosed containment body is mounted on a plurality of legs.

8. The transitionary septic tank of claim 1, wherein the divider bifurcates a substantial portion of the interior portion.

9. The transitionary septic tank of claim 1, further comprising a perimeter channel formed by an interior wall along a surface of the enclosed containment body, the perimeter channel having an inlet conduit and an outlet conduit.

10. The transitionary septic tank of claim 9, further comprising a heated fluid circulated within the perimeter channel.

11. The transitionary septic tank of claim 9, wherein the interior wall is formed along an exterior surface of the enclosed containment body.

12. A method of removing debris from septic waste before inputting the septic waste into a waste treatment tank, the method comprising the steps of:
   inputting the septic waste through an inlet opening and into an interior portion of an enclosed containment body;
   channeling the septic waste, at least briefly, into a lower portion of the enclosed containment body using a divider formed in the interior portion; and
   releasing the septic waste out a first outlet opening formed proximate to an upper portion of the enclosed containment body and a second outlet opening within a sidewall of the enclosed containment body proximate to a bottom portion of the enclosed containment body, having an outlet conduit exterior to the enclosed containment body fluidly connecting the first outlet opening and the second outlet opening, wherein at least a portion of the debris remains in the lower portion of the enclosed containment body.

13. The method of claim 12, wherein the step of inputting the septic waste through the inlet opening further comprises opening an inlet valve in the inlet opening to admit the septic waste into the enclosed containment body.

14. The method of claim 12, further comprising the steps of:
   opening a sealable door compatible with a bottom opening formed in a bottom section of the enclosed containment body; and
   releasing the debris from the enclosed containment body through the bottom opening.

15. The method of claim 12, further comprising the step of releasing the septic waste out a second outlet opening formed in the enclosed containment body, wherein the second outlet opening is formed proximate to a bottom portion of the enclosed containment body.

16. The method of claim 15, further comprising the step of inputting water through the inlet opening and into the interior portion of the enclosed containment body to flush out the interior portion of the enclosed containment body through the second opening.

17. The method of claim 12, further comprising circulating a fluid along a perimeter channel of the enclosed containment body, wherein the fluid is kept separate from the septic waste.

18. A system for removing debris from a septic waste before inputting the septic waste into a waste treatment tank, the system comprising:

means for inputting the septic waste into an interior portion of an enclosed containment body;

means for channeling the septic waste, at least briefly, into a lower portion of the enclosed containment body; and releasing the septic waste out a first outlet opening formed proximate to an upper portion of the enclosed containment body and a second outlet opening within a sidewall of the enclosed containment body proximate to a bottom portion of the enclosed containment body, having an outlet conduit exterior to the enclosed containment body fluidly connecting the first outlet opening and the second outlet opening, wherein at least a portion of the debris remains in the lower portion of the enclosed containment body.

19. The system of claim 18, further comprising means for maintaining a temperature of the enclosed containment body above freezing.

\* \* \* \* \*